US012809434B2

(12) United States Patent
Ma et al.

(10) Patent No.: US 12,809,434 B2
(45) Date of Patent: Nov. 24, 2026

(54) ADAPTIVE TEMPERATURE CONTROL SYSTEM

(71) Applicant: Dell Products L.P., Round Rock, TX (US)

(72) Inventors: Xin Zhi Ma, Shanghai (CN); Zhuoya Shi, Beijing (CN)

(73) Assignee: Dell Products L.P., Round Rock, TX (US)

( * ) Notice: Subject to any disclaimer, the term of this patent is extended or adjusted under 35 U.S.C. 154(b) by 508 days.

(21) Appl. No.: 18/503,435

(22) Filed: Nov. 7, 2023

(65) Prior Publication Data

US 2025/0123660 A1 Apr. 17, 2025

(30) Foreign Application Priority Data

Oct. 12, 2023 (CN) ........................ 202311323585.6

(51) Int. Cl.
*G06F 1/20* (2006.01)
*F25B 21/02* (2006.01)

(52) U.S. Cl.
CPC .............. *G06F 1/206* (2013.01); *F25B 21/02* (2013.01); *G06F 1/203* (2013.01)

(58) Field of Classification Search
CPC . G06F 1/206; G06F 1/203; G06F 1/20; F25B 21/02
See application file for complete search history.

(56) References Cited

U.S. PATENT DOCUMENTS

2008/0239654 A1* 10/2008 Bisson ..................... G07C 7/00
2021/0026425 A1* 1/2021 Spica ................... H05K 1/0203
2023/0248934 A1* 8/2023 Youngblood .......... G16H 20/70 702/19

FOREIGN PATENT DOCUMENTS

KR 20050032350 A * 4/2005 ............. H04B 1/036

* cited by examiner

*Primary Examiner* — Chad G Erdman
(74) *Attorney, Agent, or Firm* — McDermott Will & Schulte LLP

(57) ABSTRACT

An adaptive temperature control system, including a computing component; an internal heat sink coupled to the computing component; a TEC in thermal communication with the internal heat sink; an external heat sink including a casing surrounding the computing component, the internal heat sink, and the TEC; a sensor configured to detect a temperature of the computing component; a processor having access to memory media storing instructions executable by the processor to perform operations, comprising: comparing the temperature of the computing component to a first threshold; determining that the temperature of the computing component is greater than a first threshold; in response to determining that the temperature of the computing component is greater than the first threshold: adjusting a temperature control mode of the TEC such that heat transferred from the computing component to the TEC through the internal heat sink is transferred to the external heat sink by the TEC.

18 Claims, 9 Drawing Sheets

ADAPTIVE TEMPERATURE CONTROL SYSTEM

BACKGROUND

Field of the Disclosure

The disclosure relates generally to an information handling system, and in particular, an adaptive temperature control system of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in an adaptive temperature control system, including: a computing component; an internal heat sink coupled to the computing component; a thermal-electric chiller (TEC) in thermal communication with the internal heat sink; an external heat sink including a casing surrounding the computing component, the internal heat sink, and the TEC; a sensor configured to detect a temperature of the computing component; a processor having access to memory media storing instructions executable by the processor to perform operations, comprising: comparing the temperature of the computing component to a first threshold; determining, based on the comparing, that the temperature of the computing component is greater than a first threshold; in response to determining that the temperature of the computing component is greater than the first threshold: adjusting a temperature control mode of the TEC such that heat transferred from the computing component to the TEC through the internal heat sink is transferred to the external heat sink by the TEC.

Other embodiments of these aspects include corresponding systems, apparatus, and computer programs, configured to perform the actions of the methods, encoded on computer storage devices.

These and other embodiments may each optionally include one or more of the following features. For instance, determining, based on the comparing, that the temperature of the computing component is less than a second threshold; in response to determining that the temperature of the computing component is less than the second threshold: adjusting the temperature control mode of the TEC to a second mode such that heat transferred from the external heat sink to the TEC is transferred by the TEC through the internal heat sink to the computing component. Adjusting the temperature control mode includes adjusting a polarity of current provided to the TEC. Determining, based on the comparing, that the temperature of the computing component is less than the first threshold and greater than the second threshold; in response to determining that the temperature of the computing component is less than the first threshold and greater than the second threshold: adjusting a power state of the TEC to an off power state. The TEC is coupled to the internal heat sink. The TEC is coupled to the external heat sink. An additional internal heat sink in thermal communication with the internal heat sink, the additional internal heat sink spaced-apart from the internal heat sink, wherein the additional internal heat sink is coupled to the computing component. One or more heat pipes coupled between the additional internal heat sink and the internal heat sink, wherein the one or more heat pipes are in thermal communication between the additional heat sink and the internal heat sink. Additional computing components in thermal communication with the internal heat sink, the additional components spaced-apart from the internal heat sink.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
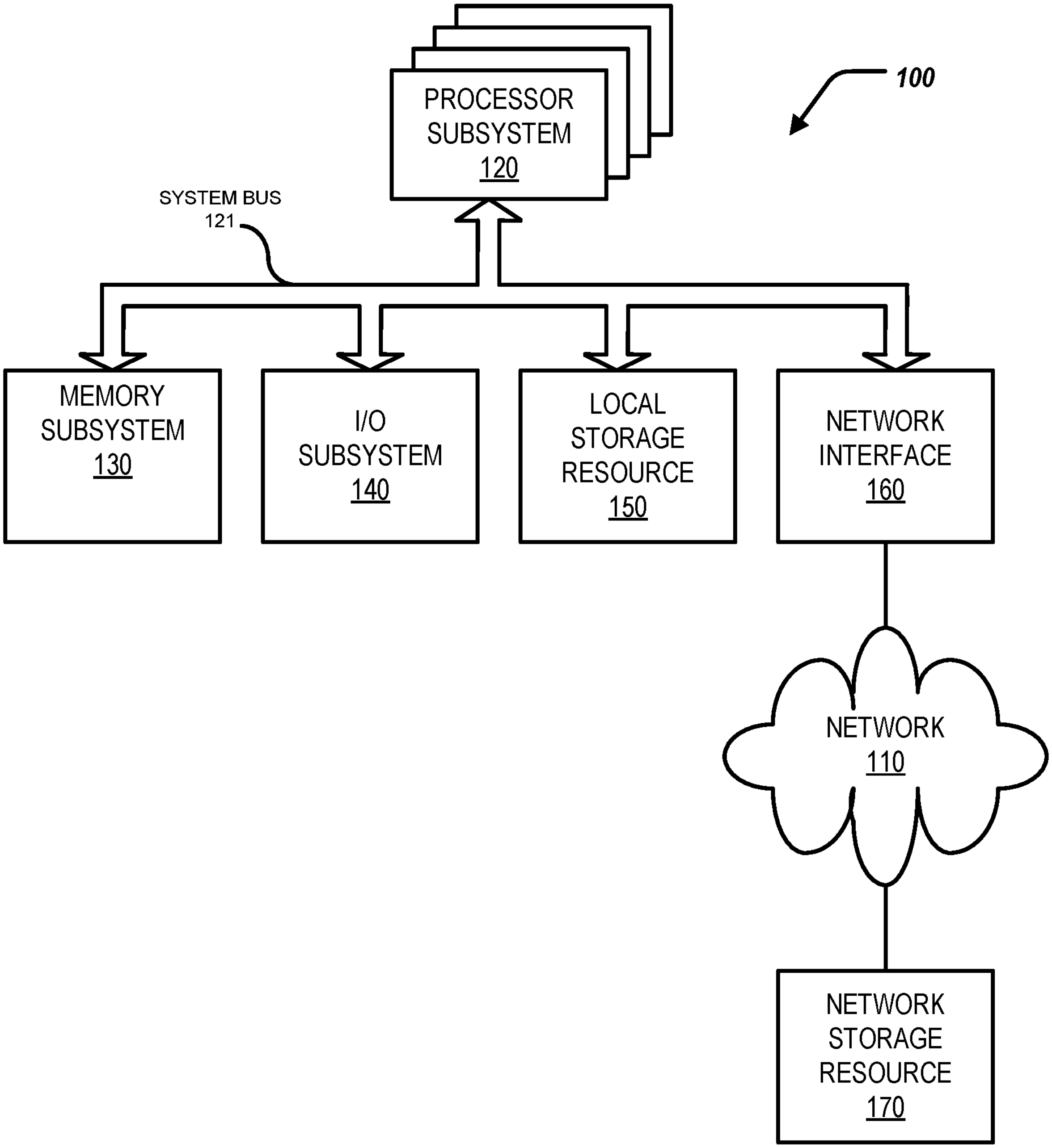
FIG. 1 is a block diagram of selected elements of an embodiment of an information handling system.

This disclosure discusses an adaptive temperature control system of an information handling system. In short, regulation of a temperature of a computing component (cooling and/or heating) is discussed, including utilizing a thermal-electric chiller. An external heat sink, a casing of the external heat sink, and/or a casing of the information handling system can be utilized to facilitate temperature control of the computing component.

Specifically, this disclosure discusses an adaptive temperature control system, including: a computing component; an internal heat sink coupled to the computing component; a thermal-electric chiller (TEC) in thermal communication with the internal heat sink; an external heat sink including a casing surrounding the computing component, the internal heat sink, and the TEC; a sensor configured to detect a temperature of the computing component; a processor having access to memory media storing instructions executable by the processor to perform operations, comprising: comparing the temperature of the computing component to a first threshold; determining, based on the comparing, that the temperature of the computing component is greater than a first threshold; in response to determining that the temperature of the computing component is greater than the first threshold: adjusting a temperature control mode of the TEC such that heat transferred from the computing component to the TEC through the internal heat sink is transferred to the external heat sink by the TEC.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-9 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
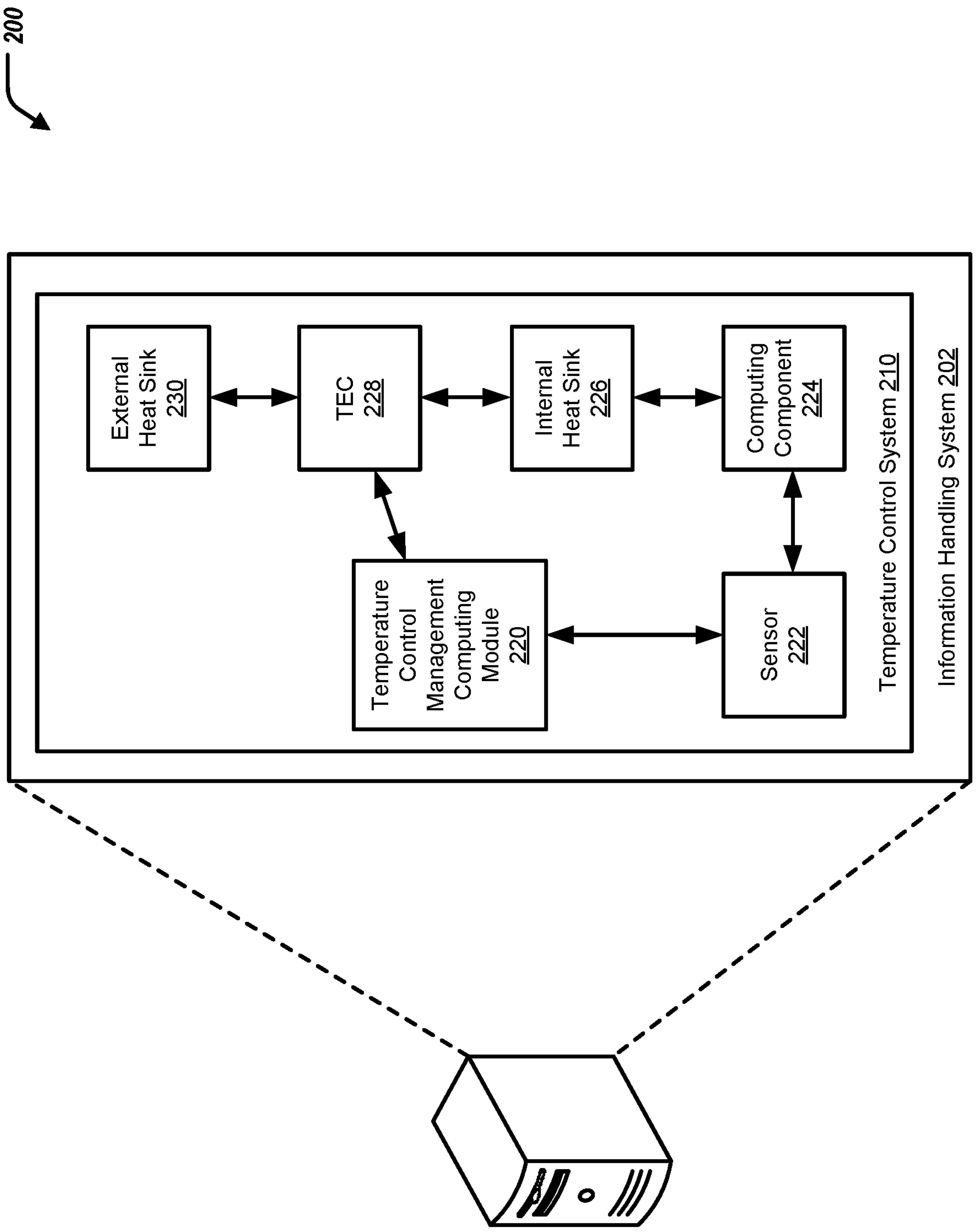
FIGS. 2, 4, 6 illustrates respective block diagrams of an information handling system, including a temperature control system.

Turning to FIG. 2, FIG. 2 illustrates an environment 200 including an information handling system 202. The information handling system 202 can include a temperature control system 210. The temperature control system 210 can include a temperature control management computing module 220, a temperature sensor 222, a computing component 224, an internal heat sink 226, a thermal-electric chiller (TEC) 228, and an external heat sink 230. In some examples, the information handling system 202 is similar to, or includes, the information handling system 100 of FIG. 1. In some examples, the temperature control management computing module 220 can be included by, or in communication with, the processor subsystem 120 of FIG. 1. In some examples, the temperature control management computing module 220 is included by, or in communication with, a baseband management controller (BMC) of the information handling system 100. In some examples, the information handling system 202 can include multiple temperature control systems 210.

The computing component 224 can be in thermal communication with the internal heat sink 226. The internal heat sink 226 can be in thermal communication with the computing component 224 and the TEC 228. The TEC 228 can be in thermal communication with the internal heat sink 226 and the external heat sink 230. The external heat sink 230 can be in thermal communication with the TEC 228.

The sensor 222 can be in communication with the computing component 224. The thermal control management computing module 220 can be in communication with the sensor 222 and the TEC 228.

In short, the temperature control management computing module 220 can facilitate regulation of a temperature of the computing component 224 (cooling and/or heating), including utilizing the TEC 228. In some examples, the temperature control management computing module 220 can leverage the external heat sink 230, a casing of the external heat sink 230, and/or a casing of the information handling system 202 to facilitate temperature control of the computing component 224. Additionally, the temperature controls system 210 is fanless, and avoids fan reliability issues, and fan noise.

In a first implementation, the temperature control system 210 can include a direct thermal conduction implementation. That is, the temperature control system 210 can directly utilize the internal heat sink 226 and the TEC 228 to transfer heat between the computing component 224 and the external heat sink 230 (casing) and from the external heat sink 230 (casing) to the computing component 224, based upon the mode of operation, described further herein.

Figure 3:
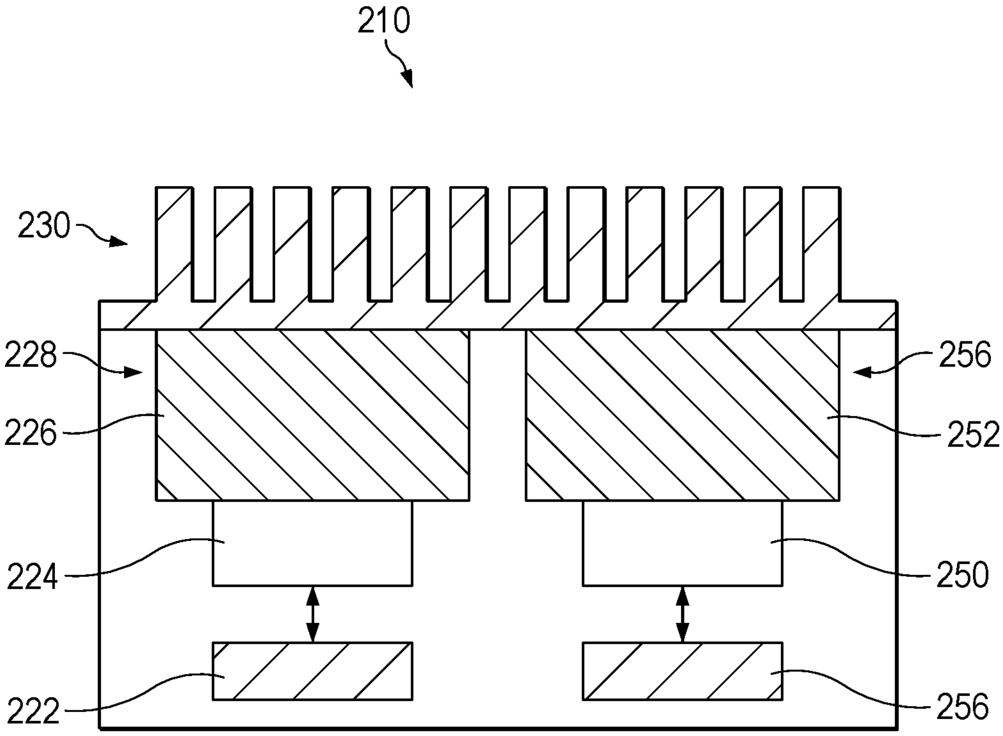
FIGS. 3, 5, 7 illustrate respective sideview of a portion of the temperature control system

FIG. 3 illustrates a sideview of a portion of the temperature control system 210. The temperature control system 210 can include the computing component 224. In some examples, the computing component 224 can include a central processing unit (CPU), a graphics processing unit (GPU), memory, chipsets, or any other type of computing component. The temperature control system 210 can include the internal heat sink 226. The internal heat sink 226 can be coupled to the computing component 224. The internal heat sink 226 can facilitate transfer of heat from the computing component 224 and/or transfer of heat to the computing component 224.

The temperature control system 210 can include the TEC 228. The TEC 228 can be in thermal communication with the internal heat sink 226. The TEC 228 can switch between temperature control modes-a heating control mode and a cooling control mode. Specifically, the temperature control management module 220 can provide signals to control a power state of the TEC 228 and additionally, when the TEC 228 is in a power state, control the temperature control mode of the TEC 228, described further herein.

In some examples, the TEC 228 is coupled to the internal heat sink 226.

Figure 8:
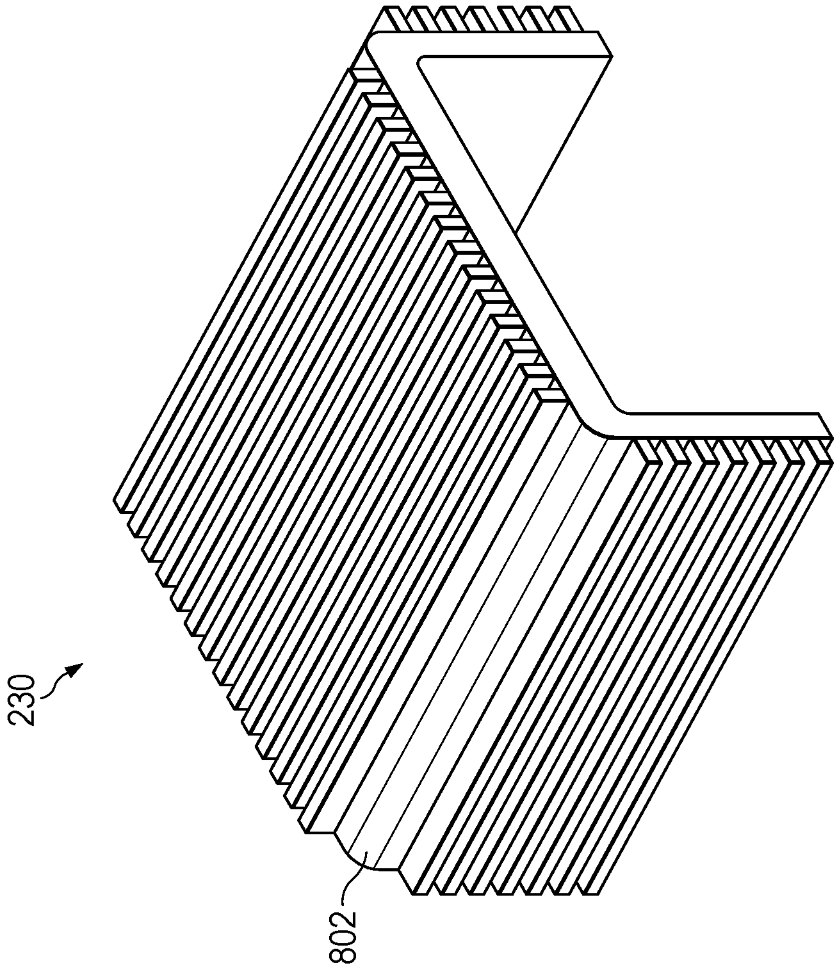
FIG. 8 illustrates a perspective view of an external heat sink

The temperature control system 210 can include the external heat sink 230. FIG. 8 illustrates a perspective view of the external heat sink 230. The external heat sink 230 can include a casing 802. The casing 802 can surround the computing component 224, the internal heat sink 226, and the TEC 228.

In some examples, the TEC 228 is coupled to the external heat sink 230. In some examples, the TEC 228 is directly in contact with a casing of the external heat sink 230. In some examples, the TEC 228 is additionally in contact with a casing of the information handling system 202—e.g., an outer shell or casing of the information handling system. For example, when the information handling system 202 includes a portable computing device such as a laptop/notebook, the TEC 228 can be in direct contact with a cover of the portable computing device—the "D" cover. To that end, the casing of the external heat sink 230 and/or the casing of the information handling system 202 can facilitate transfer of heat from the computing component 224 and/or to the computing component 224, described further herein.

In some examples, the external heat sink 230 is directly in contact with the casing of the information handling system 202—e.g., the outer shell or casing of the information handling system. For example, when the information handling system 202 includes a portable computing device such as a laptop/notebook, the external heat sink 230 can be in direct contact with the cover of the portable computing device—the "D" cover. To that end, the casing of the external heat sink 230 and/or the casing of the information handling system 202 can facilitate transfer of heat from the computing component 224 and/or to the computing component 224, described further herein.

Referring back to FIG. 3, the sensor 222 is configured to detect a temperature of the computing component 224. For example, the sensor 222 can detect the temperature of the computing component 224, and/or the environment proximate to the computing component 224. The sensor 222 can provide the temperature of the computing component 224 to the temperature control management computing module 220. The sensor 222 can provide the temperature of the computing component 224 to the temperature control management computing module 220 in response to a request from the temperature control management computing module 220, or automatically at intervals (e.g., every 1 millisecond, 1 second).

To that end, referring to FIGS. 2 and 3, the temperature control management computing module 220 receives data indicating the temperature (of the computing component 224) from the sensor 222. The temperature control management computing module 220 compares the temperature of the computing component 224 to a first threshold. For example, the first threshold could be above an operational range of the information handling system 202. For example, the first threshold can be 90° Celsius.

In some examples, the temperature control management computing module 220 determines, based on the comparing, that the temperature of the computing component 224 is greater than the first threshold. For example, the temperature of the computing component 224 is greater than 90° Celsius. The temperature control management computing module 220, in response to determining that the temperature of the computing component 224 is greater than the first threshold, adjusts the temperature control mode of the TEC 228 by providing a signal to the TEC 228 to enable a cooling control mode of the TEC 228. Specifically, when the TEC 228 is in the cooling control mode, heat that is generated by the computing component 224 that is transferred through the internal heat sink 226 is transferred by the TEC 228 to the external heat sink 230. In some examples, the temperature control management computing modules 220 adjusts a polarity of current provided to the TEC 228 such that the cooling mode of the TEC 228 is enabled.

In some examples, the heat that is transferred by the TEC 228 to the external heat sink 230 is transferred directly to the casing of the external heat sink 230. In some examples, the heat that is that is transferred by the TEC 228 to the external heat sink 230 is transferred directly to the casing of the information handling system 202.

To that end, after enabling the cooling control mode of the TEC 228, the temperature control management computing module 220 receives additional data indicating an updated temperature (of the computing component 224) from the sensor 222 (at a later time). The temperature control management computing module 220 compares the updated temperature of the computing component 224 to the first threshold. In some examples, the temperature control management computing module 220 determines, based on the comparing, that the temperature of the computing component 224 is less than the first threshold. For example, the temperature of the computing component 224 is less than 90° Celsius. The temperature control management computing module 220, in response to determining that the temperature of the computing component 224 is less than the first threshold, adjusts the power state of the TEC 228 to an off power state.

In some examples, when the temperature control management computing module 220 receives data indicating the temperature (of the computing component 224) from the sensor 222, the temperature control management computing module 220 compares the temperature of the computing component 224 to a second threshold. For example, the second threshold could be below an operational range of the information handling system 202. For example, the first threshold can be 0° Celsius.

The temperature control management computing module 220 determines, based on the comparing, that the temperature of the computing component 224 is less than the second threshold. For example, the temperature of the computing component 224 is less than 0° Celsius. The temperature control management computing module 220, in response to determining that the temperature of the computing component 224 is less than the second threshold, adjusts the temperature control mode of the TEC 228 by providing a signal to the TEC 228 to enable a heating control mode of the TEC 228. Specifically, when the TEC 228 is in the heating control mode, heat that is transferred from the external heat sink 230 to the TEC 228 is transferred by the TEC 228 through the internal heat sink 226 to the computing component 224.

In some examples, the temperature control management computing modules 220 adjusts a polarity of current provided to the TEC 228 such that the heating mode of the TEC 228 is enabled. In some examples, the polarity is reversed from the polarity that enables the cooling mode of the TEC 228. In some examples, the heat that is transferred to the computing component 224 by the TEC 228 is transferred directly from the casing of the external heat sink 230. In some examples, the heat that is transferred to the computing component 224 by the TEC 228 is transferred directly from the casing of the information handling system 202.

To that end, after enabling the heating control mode of the TEC 228, the temperature control management computing module 220 receives additional data indicating an updated temperature (of the computing component 224) from the sensor 222 (at a later time). The temperature control management computing module 220 compares the updated temperature of the computing component 224 to the second threshold. In some examples, the temperature control management computing module 220 determines, based on the comparing, that the temperature of the computing component 224 is greater than the second threshold. For example, the temperature of the computing component 224 is greater than 0° Celsius. The temperature control management computing module 220, in response to determining that the temperature of the computing component 224 is greater than the second threshold, adjusts the power state of the TEC 228 to an off power state.

In some examples, the temperature control management computing module 220 determines, based on the comparing, that the temperature of the computing component 224 is less than the first threshold and greater than the second threshold. For example, the temperature of the computing component 224 is less than 90° Celsius and greater than 0° Celsius. The temperature control management computing module 220, in response to determining that the temperature of the computing component 224 is less than the first threshold and greater than the second threshold, adjusts the power state of the TEC 228 to an off power state.

In some examples, the temperature control system 210 includes an additional computing component 250, similar to the computing element 224. The temperature control system 210 can further include an additional internal heat sink 252, similar to the internal heat sink 226. The temperature control system 210 can further include an additional TEC 254, similar to the TEC 228. The temperature control system 210 can further include an additional sensor 256, similar to the sensor 222.

The additional internal heat sink 252 can be coupled to the additional computing component 250. The additional internal heat sink 252 can facilitate transfer of heat from the additional computing component 250 and/or transfer of heat to the additional computing component 250.

The additional TEC 228 can be in thermal communication with the additional internal heat sink 252. The additional TEC 256 can switch between temperature control modes-a heating control mode and a cooling control mode. Specifically, the temperature control management module 220 can provide signals to control a power state of the additional TEC 256 and additionally, when the additional TEC 256 is in an on-power state, control the temperature control mode of the additional TEC 256, described further herein.

In some examples, the additional TEC 256 is coupled to the additional internal heat sink 252.

In some examples, the additional TEC 256 is coupled to the external heat sink 230. In some examples, the additional TEC 256 is directly in contact with a casing of the external heat sink 230. In some examples, the additional TEC 256 is additionally in contact with a casing of the information handling system 202—e.g., an outer shell or casing of the information handling system. For example, when the information handling system 202 includes a portable computing device such as a laptop/notebook, the additional TEC 256 can be in direct contact with a cover of the portable computing device—the "D" cover. To that end, the casing of the external heat sink 230 and/or the casing of the information handling system 202 can facilitate transfer of heat from the computing component 224 and/or to the computing component 224, described further herein.

To that end, the temperature control management computing module 220 can receive temperature data from the sensor 256 similar to that of the sensor 222, and compare such temperature to the first threshold and/or the second threshold. To that end, the temperature control management computing module 220 can provide appropriate signals to the additional TEC 256 to place the additional TEC 256 in the appropriate cooling or heating control mode.

Additionally, once each of the components 225 and 250 are in the appropriate temperature region (less than the first threshold and greater than the second threshold), the temperature control management computing module 220 adjusts the power states of the TEC 228 and the additional TEC 256 to an off power state.

Figure 4:
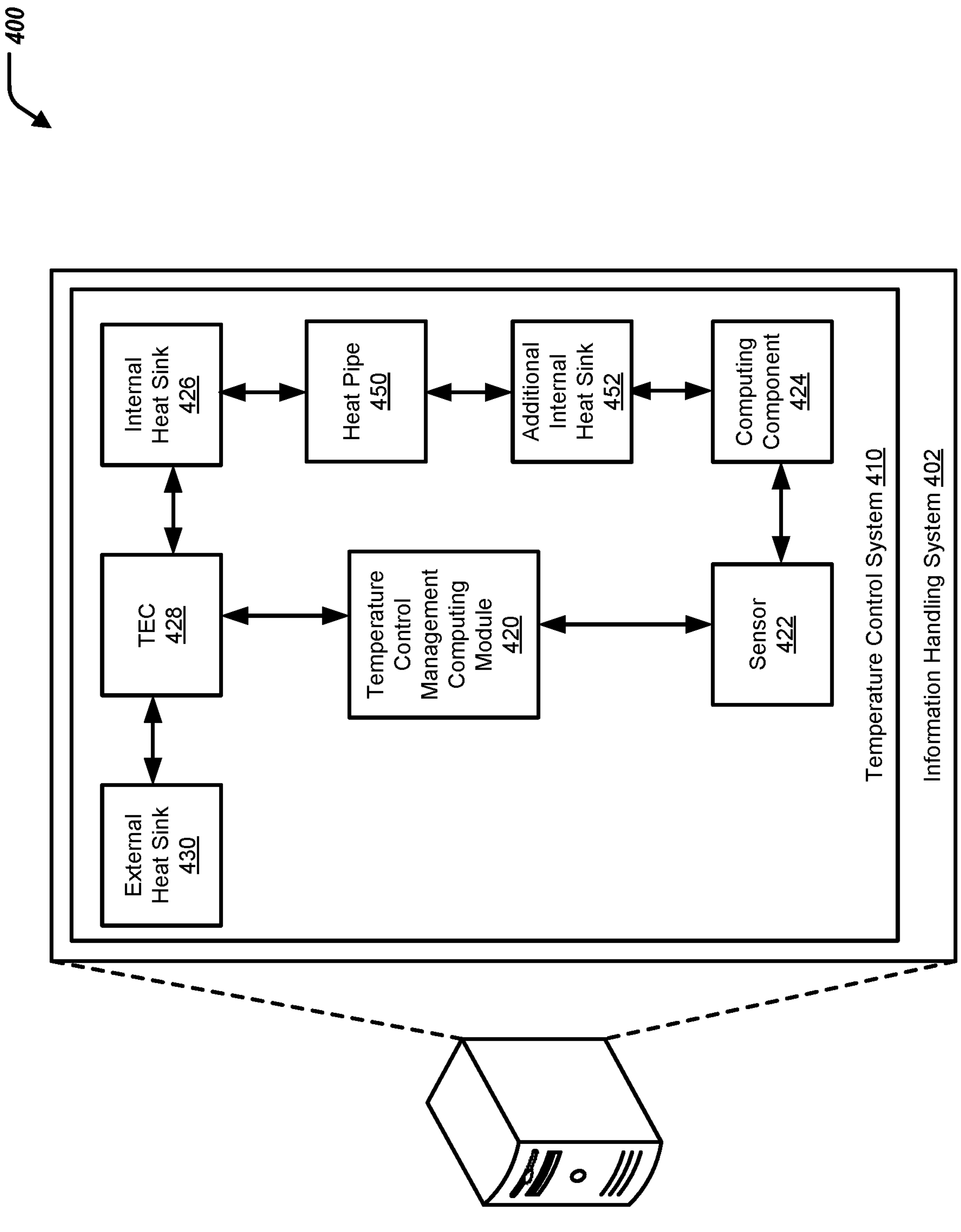

Turning to FIG. 4, FIG. 4 illustrates an environment 400 including an information handling system 402. The information handling system 402 can include a temperature control system 410. The temperature control system 410 can include a temperature control management computing module 420, a temperature sensor 422, a computing component 424, an internal heat sink 426, a thermal-electric chiller (TEC) 428, and an external heat sink 430. The temperature control system 410 can further include a heat pipe (or heat pipes) 450 and an additional internal heat sink 452. In some examples, the information handling system 402 can include multiple temperature control systems 410.

In some examples, the information handling system 402 is similar to, or includes, the information handling system 100 of FIG. 1. In some examples, the temperature control management computing module 420 can be included by, or in communication with, the processor subsystem 120 of FIG. 1. In some examples, the temperature control management computing module 420 is included by, or in communication with, a baseband management controller (BMC) of the information handling system 100.

The computing component 424 can be in thermal communication with the additional internal heat sink 452. The additional internal heat sink 452 can be in thermal communication with the computing component 424 and the heat pipe 450. The heat pipe 450 can be in thermal communication with the additional internal heat sink 452 and the internal heat sink 426. The internal heat sink 426 can be in thermal communication with the heat pipe 450 and the TEC 428. The TEC 428 can be in thermal communication with the internal heat sink 426 and the external heat sink 430. The external heat sink 450 can be in thermal communication with the TEC 428.

The sensor 422 can be in communication with the computing component 424. The thermal control management computing module 420 can be in communication with the sensor 422 and the TEC 428.

In a second implementation, the temperature control system 410 can include a remote thermal conduction implementation. That is, the temperature control system 410 can use heat pipes 450 to conduct heat from the computing component 424 to the internal heat sink 426, and ultimately the external heat sink 430 (casing) and from the external heat sink 430 (casing) to the computing component 424, based upon the mode of operation, described further herein.

Figure 5:
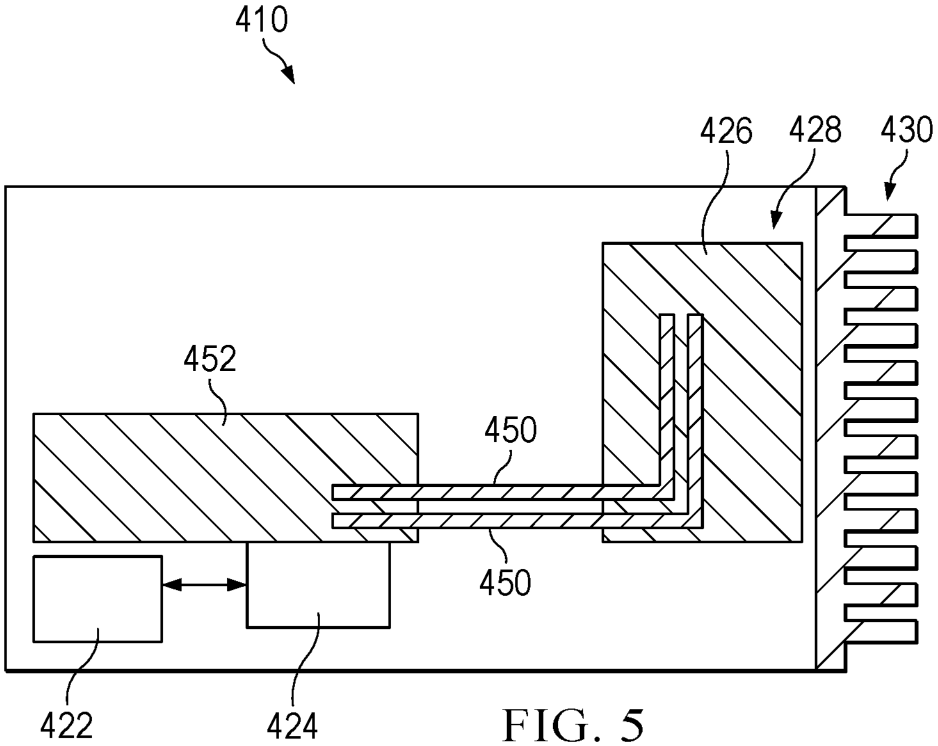

FIG. 5 illustrates a sideview of a portion of the temperature control system 410. The temperature control system 410 can include the computing component 424. In some examples, the computing component 424 can include a central processing unit (CPU), a graphics processing unit (GPU), memory, chipsets, or any other type of computing component. The temperature control system 410 can include the additional internal heat sink 452. The additional internal heat sink 452 can be coupled to the computing component 424. The additional internal heat sink 452 can facilitate transfer of heat from the computing component 424 and/or transfer of heat to the computing component 424.

The temperature control system 410 can include the heat pipe(s) 450. The heat pipes 450 are coupled between the additional internal heat sink 452 and the internal heat sink 426. The heat pipes 452 can facilitate transfer of heat between the additional internal heat sink 452 and the internal heat sink 426.

The temperature control system 410 can include the internal heat sink 426. The internal heat sink 426 can be coupled to the heat pipes 450 and the TEC 428. The internal heat sink 426 can facilitate transfer of heat from the additional internal heat sink 452 and/or transfer of heat to the additional internal heat sink 452.

The temperature control system 410 can include the TEC 428. The TEC 428 can be in thermal communication with the internal heat sink 426. The TEC 428 can switch between temperature control modes-a heating control mode and a cooling control mode. Specifically, the temperature control management module 420 can provide signals to control a power state of the TEC 428 and additionally, when the TEC 428 is in an on-power state, control the temperature control mode of the TEC 428, described further herein.

In some examples, the TEC 428 is coupled to the internal heat sink 426.

The temperature control system 410 can include the external heat sink 430, similar to the external heat sink 230 shown in FIG. 8.

In some examples, the TEC 428 is coupled to the external heat sink 430. In some examples, the TEC 428 is directly in contact with a casing of the external heat sink 430. In some examples, the TEC 430 is additionally in contact with a casing of the information handling system 402—e.g., an outer shell or casing of the information handling system. For example, when the information handling system 402 includes a portable computing device such as a laptop/notebook, the TEC 428 can be in direct contact with a cover of the portable computing device—the "D" cover. To that end, the casing of the external heat sink 430 and/or the casing of the information handling system 402 can facilitate transfer of heat from the computing component 424 and/or to the computing component 424, described further herein.

In some examples, the external heat sink 430 is directly in contact with the casing of the information handling system 402—e.g., the outer shell or casing of the information handling system. For example, when the information handling system 402 includes a portable computing device such as a laptop/notebook, the external heat sink 430 can be in direct contact with the cover of the portable computing device—the "D" cover. To that end, the casing of the external heat sink 430 and/or the casing of the information handling system 402 can facilitate transfer of heat from the computing component 424 and/or to the computing component 424, described further herein.

Referring back to FIG. 3, the sensor 422 is configured to detect a temperature of the computing component 424. For example, the sensor 422 can detect the temperature of the computing component 424, and/or the environment proximate to the computing component 424. The sensor 422 can provide the temperature of the computing component 424 to the temperature control management computing module 420. The sensor 422 can provide the temperature of the computing component 424 to the temperature control management computing module 420 in response to a request from the temperature control management computing module 420, or automatically at intervals (e.g., every 1 millisecond, 1 second).

To that end, referring to FIGS. 4 and 5, the temperature control management computing module 420 receives data indicating the temperature (of the computing component 424) from the sensor 422. The temperature control management computing module 420 compares the temperature of the computing component 424 to a first threshold. For example, the first threshold could be above an operational range of the information handling system 402. For example, the first threshold can be 90° Celsius.

In some examples, the temperature control management computing module 420 determines, based on the comparing, that the temperature of the computing component 424 is greater than the first threshold. For example, the temperature of the computing component 424 is greater than 90° Celsius. The temperature control management computing module 420, in response to determining that the temperature of the computing component 424 is greater than the first threshold, adjusts the temperature control mode of the TEC 428 by providing a signal to the TEC 428 to enable a cooling control mode of the TEC 428. Specifically, when the TEC 428 is in the cooling control mode, heat that is generated by the computing component 424 that is transferred through the additional internal heat sink 452 is transferred through the heat pipes 450 to the internal heat sink 426 and by the TEC 428 to the external heat sink 430. In some examples, the temperature control management computing modules 420 adjusts a polarity of current provided to the TEC 428 such that the cooling mode of the TEC 428 is enabled.

In some examples, the heat that is transferred by the TEC 428 to the external heat sink 430 is transferred directly to the casing of the external heat sink 430. In some examples, the heat that is that is transferred by the TEC 428 to the external heat sink 430 is transferred directly to the casing of the information handling system 402.

To that end, after enabling the cooling control mode of the TEC 428, the temperature control management computing module 420 receives additional data indicating an updated temperature (of the computing component 424) from the sensor 422 (at a later time). The temperature control management computing module 420 compares the updated temperature of the computing component 424 to the first threshold. In some examples, the temperature control management computing module 420 determines, based on the comparing, that the temperature of the computing component 424 is less than the first threshold. For example, the temperature of the computing component 424 is less than 90° Celsius. The temperature control management computing module 420, in response to determining that the temperature of the computing component 424 is less than the first threshold, adjusts the power state of the TEC 428 to an off power state.

In some examples, when the temperature control management computing module 420 receives data indicating the temperature (of the computing component 424) from the sensor 422, the temperature control management computing module 420 compares the temperature of the computing component 424 to a second threshold. For example, the second threshold could be below an operational range of the information handling system 402. For example, the first threshold can be 0° Celsius.

The temperature control management computing module 420 determines, based on the comparing, that the temperature of the computing component 424 is less than the second threshold. For example, the temperature of the computing component 424 is less than 0° Celsius. The temperature control management computing module 420, in response to determining that the temperature of the computing component 424 is less than the second threshold, adjusts the temperature control mode of the TEC 428 by providing a signal to the TEC 428 to enable a heating control mode of the TEC 428. Specifically, when the TEC 428 is in the heating control mode, heat that is transferred from the external heat sink 430 to the TEC 428 is transferred by the TEC 428 through heat pipes 450 to the internal heat sink 426 and to the computing component 424.

In some examples, the temperature control management computing modules 420 adjusts a polarity of current provided to the TEC 428 such that the heating mode of the TEC 428 is enabled. In some examples, the polarity is reversed from the polarity that enables the cooling mode of the TEC 428. In some examples, the heat that is transferred to the computing component 424 by the TEC 428 is transferred directly from the casing of the external heat sink 430. In some examples, the heat that is transferred to the computing component 424 by the TEC 428 is transferred directly from the casing of the information handling system 402.

To that end, after enabling the heating control mode of the TEC 428, the temperature control management computing module 420 receives additional data indicating an updated temperature (of the computing component 424) from the sensor 422 (at a later time). The temperature control management computing module 420 compares the updated temperature of the computing component 424 to the second threshold. In some examples, the temperature control management computing module 420 determines, based on the comparing, that the temperature of the computing component 424 is greater than the second threshold. For example, the temperature of the computing component 424 is greater than 0° Celsius. The temperature control management computing module 420, in response to determining that the temperature of the computing component 424 is greater than the second threshold, adjusts the power state of the TEC 428 to an off power state.

In some examples, the temperature control management computing module 420 determines, based on the comparing, that the temperature of the computing component 424 is less than the first threshold and greater than the second threshold. For example, the temperature of the computing component 424 is less than 90° Celsius and greater than 0° Celsius. The temperature control management computing module 420, in response to determining that the temperature of the computing component 424 is less than the first threshold and greater than the second threshold, adjusts the power state of the TEC 428 to an off power state.

Figure 6:
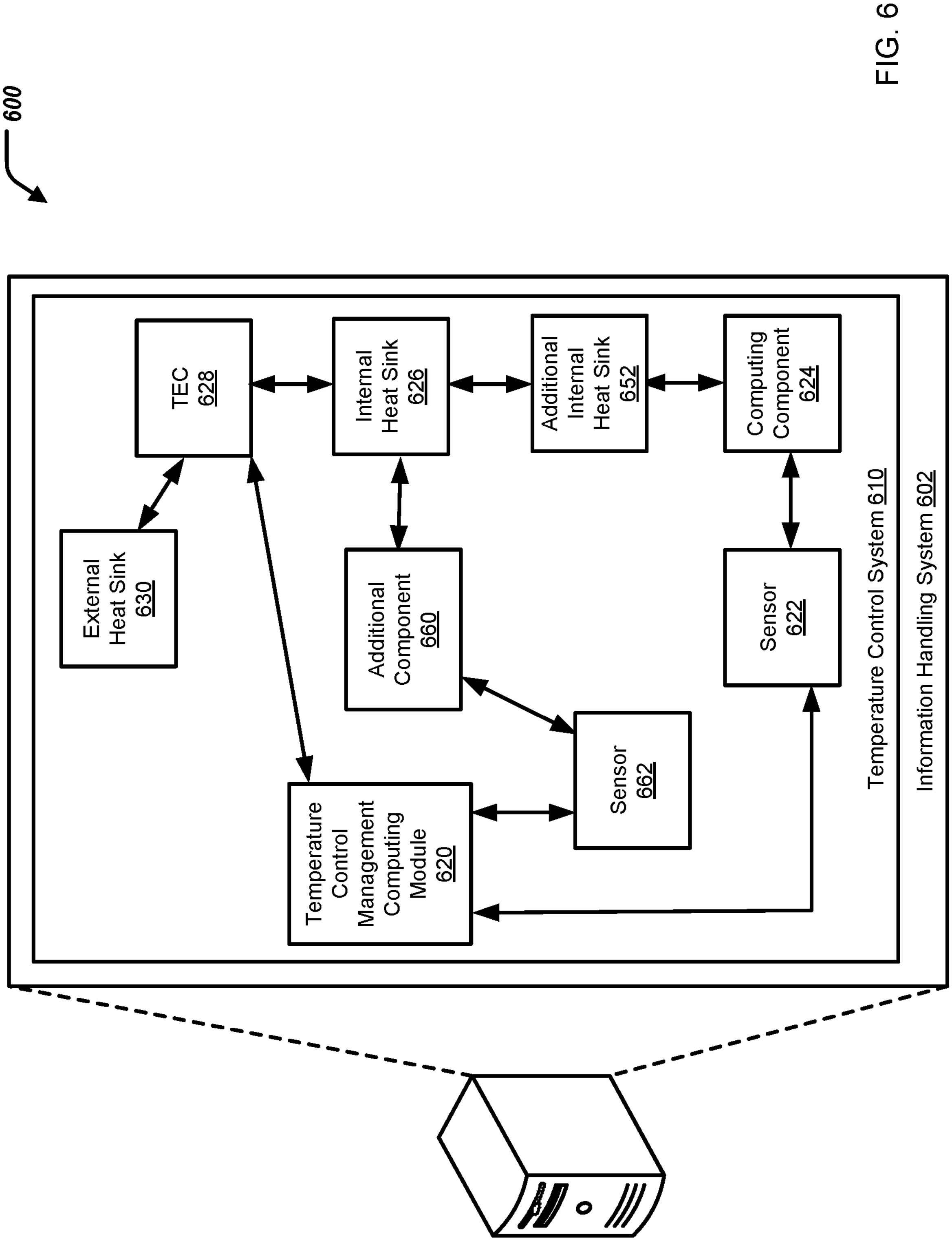

Turning to FIG. 6, FIG. 6 illustrates an environment 600 including an information handling system 602. The information handling system 602 can include a temperature control system 610. The temperature control system 610 can include a temperature control management computing module 620, a temperature sensor 622, a computing component 624, an internal heat sink 626, a thermal-electric chiller (TEC) 628, and an external heat sink 630. The temperature control system 610 can further include additional computing component 660, and an additional sensor 662. In some examples, the information handling system 602 can include multiple temperature control systems 610.

In some examples, the information handling system 602 is similar to, or includes, the information handling system 100 of FIG. 1. In some examples, the temperature control management computing module 620 can be included by, or in communication with, the processor subsystem 120 of FIG. 1. In some examples, the temperature control management computing module 620 is included by, or in communication with, a baseband management controller (BMC) of the information handling system 100.

The computing component 624 can be in thermal communication with the additional internal heat sink 652. The additional internal heat sink 652 can be in thermal communication with the computing component 624 and the internal heat sink 626. The internal heat sink 626 can be in thermal communication with the additional internal heat sink 652, the additional computing component 660, and the TEC 628. The TEC 628 can be in thermal communication with the internal heat sink 626 and the external heat sink 630. The external heat sink 630 can be in thermal communication with the TEC 628.

The sensor 622 can be in communication with the computing component 624. The sensor 662 can be in communication with the additional computing component 660.

The thermal control management computing module 620 can be in communication with the sensor 622, the sensor 662, and the TEC 628.

In a third implementation, the temperature control system 610 can include an indirect thermal conduction implementation. That is, the temperature control system 610 can use indirect thermal conduction to conduct heat from the computing component 624 to the internal heat sink 626, and ultimately the external heat sink 630 (casing) and from the external heat sink 630 (casing) to the computing component 624, based upon the mode of operation, described further herein. Further, the temperature control system 610 can use indirect thermal conduction to conduct heat from the additional computing component 660 to the internal heat sink 626, and ultimately the external heat sink 630 (casing) and from the external heat sink 630 (casing) to the additional computing component 660, based upon the mode of operation, described further herein.

Figure 7:
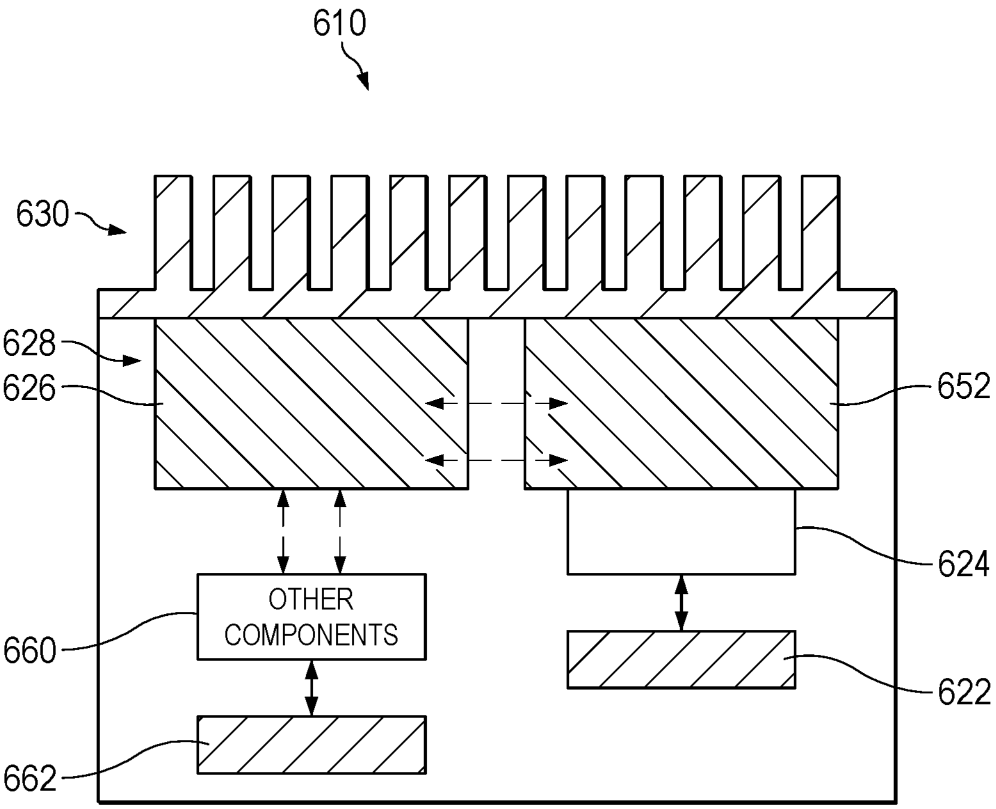

FIG. 7 illustrates a sideview of a portion of the temperature control system 610. The temperature control system 610 can include the computing component 624. In some examples, the computing component 624 can include a central processing unit (CPU), a graphics processing unit (GPU), memory, chipsets, or any other type of computing component. The temperature control system 610 can include the additional internal heat sink 652. The additional internal heat sink 652 can be coupled to the computing component 624. The additional internal heat sink 652 can facilitate transfer of heat from the computing component 624 and/or transfer of heat to the computing component 624.

The temperature control system 610 can include the internal heat sink 626. The internal heat sink 626 can be thermally coupled to the additional heat sink 652 and the TEC 628. The internal heat sink 626 can facilitate transfer of heat from the additional internal heat sink 652 and/or transfer of heat to the additional internal heat sink 652.

The temperature control system 610 can include the TEC 628. The TEC 628 can be in thermal communication with the internal heat sink 626. The TEC 628 can switch between temperature control modes-a heating control mode and a cooling control mode. Specifically, the temperature control management module 620 can provide signals to control a power state of the TEC 628 and additionally, when the TEC 628 is in an on-power state, control the temperature control mode of the TEC 628, described further herein.

In some examples, the TEC 628 is coupled to the internal heat sink 626.

The temperature control system 610 can include the external heat sink 630, similar to the external heat sink 230 shown in FIG. 8.

In some examples, the TEC 628 is coupled to the external heat sink 630. In some examples, the TEC 628 is directly in contact with a casing of the external heat sink 630. In some examples, the TEC 630 is additionally in contact with a casing of the information handling system 602—e.g., an outer shell or casing of the information handling system. For example, when the information handling system 602 includes a portable computing device such as a laptop/notebook, the TEC 628 can be in direct contact with a cover of the portable computing device—the "D" cover. To that end, the casing of the external heat sink 630 and/or the casing of the information handling system 602 can facilitate transfer of heat from the computing component 624 and/or to the computing component 624, described further herein.

In some examples, the external heat sink 630 is directly in contact with the casing of the information handling system 602—e.g., the outer shell or casing of the information handling system. For example, when the information handling system 602 includes a portable computing device such as a laptop/notebook, the external heat sink 630 can be in direct contact with the cover of the portable computing device—the "D" cover. To that end, the casing of the external heat sink 630 and/or the casing of the information handling system 602 can facilitate transfer of heat from the computing component 624 and/or to the computing component 624, described further herein.

The sensor 622 is configured to detect a temperature of the computing component 624. For example, the sensor 622 can detect the temperature of the computing component 624, and/or the environment proximate to the computing component 624. The sensor 622 can provide the temperature of the computing component 624 to the temperature control management computing module 620. The sensor 622 can provide the temperature of the computing component 624 to the temperature control management computing module 620 in response to a request from the temperature control management computing module 620, or automatically at intervals (e.g., every 1 millisecond, 1 second).

To that end, referring to FIGS. 6 and 7, the temperature control management computing module 620 receives data indicating the temperature (of the computing component 624) from the sensor 622. The temperature control management computing module 620 compares the temperature of the computing component 624 to a first threshold. For example, the first threshold could be above an operational range of the information handling system 602. For example, the first threshold can be 90° Celsius.

In some examples, the temperature control management computing module 620 determines, based on the comparing, that the temperature of the computing component 624 is greater than the first threshold. For example, the temperature of the computing component 624 is greater than 90° Celsius. The temperature control management computing module 620, in response to determining that the temperature of the computing component 624 is greater than the first threshold, adjusts the temperature control mode of the TEC 628 by providing a signal to the TEC 628 to enable a cooling control mode of the TEC 628. Specifically, when the TEC 628 is in the cooling control mode, heat that is generated by the computing component 624 that is transferred through the additional internal heat sink 652 is transferred through thermal radiation to the internal heat sink 626 and by the TEC 628 to the external heat sink 630. In some examples, the temperature control management computing modules 620 adjusts a polarity of current provided to the TEC 628 such that the cooling mode of the TEC 628 is enabled.

In some examples, the heat that is transferred by the TEC 628 to the external heat sink 630 is transferred directly to the casing of the external heat sink 630. In some examples, the heat that is that is transferred by the TEC 628 to the external heat sink 630 is transferred directly to the casing of the information handling system 602.

To that end, after enabling the cooling control mode of the TEC 628, the temperature control management computing module 620 receives additional data indicating an updated temperature (of the computing component 624) from the sensor 622 (at a later time). The temperature control management computing module 620 compares the updated temperature of the computing component 624 to the first threshold. In some examples, the temperature control management computing module 620 determines, based on the comparing, that the temperature of the computing component 624 is less than the first threshold. For example, the temperature of the computing component 624 is less than 90° Celsius. The temperature control management computing module 620, in response to determining that the temperature of the computing component 624 is less than the first threshold, adjusts the power state of the TEC 628 to an off power state.

In some examples, when the temperature control management computing module 620 receives data indicating the temperature (of the computing component 624) from the sensor 622, the temperature control management computing module 620 compares the temperature of the computing component 624 to a second threshold. For example, the second threshold could be below an operational range of the information handling system 602. For example, the first threshold can be 0° Celsius.

The temperature control management computing module 620 determines, based on the comparing, that the temperature of the computing component 624 is less than the second threshold. For example, the temperature of the computing component 624 is less than 0° Celsius. The temperature control management computing module 620, in response to determining that the temperature of the computing component 624 is less than the second threshold, adjusts the temperature control mode of the TEC 628 by providing a signal to the TEC 628 to enable a heating control mode of the TEC 628. Specifically, when the TEC 628 is in the heating control mode, heat that is transferred from the external heat sink 630 to the TEC 628 is transferred by the TEC 628 through thermal radiation to the internal heat sink 626 and to the computing component 624.

In some examples, the temperature control management computing modules 620 adjusts a polarity of current provided to the TEC 628 such that the heating mode of the TEC 628 is enabled. In some examples, the polarity is reversed from the polarity that enables the cooling mode of the TEC 628. In some examples, the heat that is transferred to the computing component 624 by the TEC 628 is transferred directly form the casing of the external heat sink 630. In some examples, the heat that is transferred to the computing component 624 by the TEC 628 is transferred directly from the casing of the information handling system 602.

To that end, after enabling the heating control mode of the TEC 628, the temperature control management computing module 620 receives additional data indicating an updated temperature (of the computing component 624) from the sensor 622 (at a later time). The temperature control management computing module 620 compares the updated temperature of the computing component 624 to the second threshold. In some examples, the temperature control management computing module 620 determines, based on the comparing, that the temperature of the computing component 624 is greater than the second threshold. For example, the temperature of the computing component 624 is greater than 0° Celsius. The temperature control management computing module 620, in response to determining that the temperature of the computing component 624 is greater than the second threshold, adjusts the power state of the TEC 628 to an off power state.

In some examples, the temperature control management computing module 620 determines, based on the comparing, that the temperature of the computing component 624 is less than the first threshold and greater than the second threshold. For example, the temperature of the computing component 624 is less than 90° Celsius and greater than 0° Celsius. The temperature control management computing module 620, in response to determining that the temperature of the computing component 624 is less than the first threshold and greater than the second threshold, adjusts the power state of the TEC 628 to an off power state.

The sensor 662 is configured to detect a temperature of the additional computing component 660. For example, the sensor 662 can detect the temperature of the additional computing component 660, the environment proximate to the additional computing component 660. The sensor 662 can provide the temperature of the additional computing component 660 to the temperature control management computing module 620. The sensor 662 can provide the temperature of the additional computing component 660 to the temperature control management computing module 620 in response to a request from the temperature control management computing module 620, or automatically at intervals (e.g., every 1 millisecond, 1 second).

To that end, referring to FIGS. 6 and 7, the temperature control management computing module 620 receives data indicating the temperature (of the additional computing component 660) from the sensor 662. The temperature control management computing module 620 compares the temperature of the additional computing component 660 to a first threshold. For example, the first threshold could be above an operational range of the information handling system 602. For example, the first threshold can be 90° Celsius.

In some examples, the temperature control management computing module 620 determines, based on the comparing, that the temperature of the additional computing component 660 is greater than the first threshold. For example, the temperature of the additional computing component 660 is greater than 90° Celsius. The temperature control management computing module 620, in response to determining that the temperature of the additional computing component 660 is greater than the first threshold, adjusts the temperature control mode of the TEC 628 by providing a signal to the TEC 628 to enable a cooling control mode of the TEC 628. Specifically, when the TEC 628 is in the cooling control mode, heat that is generated by the additional computing component 660 is transferred through thermal radiation to the internal heat sink 626 and by the TEC 628 to the external heat sink 630. In some examples, the temperature control management computing modules 620 adjusts a polarity of current provided to the TEC 628 such that the cooling mode of the TEC 628 is enabled.

In some examples, the heat that is transferred by the TEC 628 to the external heat sink 630 is transferred directly to the casing of the external heat sink 630. In some examples, the heat that is that is transferred by the TEC 628 to the external heat sink 630 is transferred directly to the casing of the information handling system 602.

To that end, after enabling the cooling control mode of the TEC 628, the temperature control management computing module 620 receives additional data indicating an updated temperature (of the additional computing component 660) from the sensor 622 (at a later time). The temperature control management computing module 620 compares the updated temperature of the additional computing component 660 to the first threshold. In some examples, the temperature control management computing module 620 determines, based on the comparing, that the temperature of the additional computing component 660 is less than the first threshold. For example, the temperature of the additional computing component 660 is less than 90° Celsius. The temperature control management computing module 620, in response to determining that the temperature of the additional computing component 660 is less than the first threshold, adjusts the power state of the TEC 628 to an off power state.

In some examples, when the temperature control management computing module 620 receives data indicating the temperature (of the additional computing component 660) from the sensor 622, the temperature control management computing module 620 compares the temperature of the additional computing component 660 to a second threshold. For example, the second threshold could be below an operational range of the information handling system 602. For example, the first threshold can be 0° Celsius.

The temperature control management computing module 620 determines, based on the comparing, that the temperature of the additional computing component 660 is less than the second threshold. For example, the temperature of the additional computing component 660 is less than 0° Celsius. The temperature control management computing module 620, in response to determining that the temperature of the additional computing component 660 is less than the second threshold, adjusts the temperature control mode of the TEC 628 by providing a signal to the TEC 628 to enable a heating control mode of the TEC 628. Specifically, when the TEC 628 is in the heating control mode, heat that is transferred from the external heat sink 630 to the TEC 628 is transferred by the TEC 628 through the internal heat sink 626 and to the additional computing component 660 through thermal radiation.

In some examples, the temperature control management computing modules 620 adjusts a polarity of current provided to the TEC 628 such that the heating mode of the TEC 628 is enabled. In some examples, the polarity is reversed from the polarity that enables the cooling mode of the TEC 628. In some examples, the heat that is transferred to the additional computing component 660 by the TEC 628 is transferred directly from the casing of the external heat sink 630. In some examples, the heat that is transferred to the additional computing component 660 by the TEC 628 is transferred directly from the casing of the information handling system 602.

To that end, after enabling the heating control mode of the TEC 628, the temperature control management computing module 620 receives additional data indicating an updated temperature (of the additional computing component 660) from the sensor 622 (at a later time). The temperature control management computing module 620 compares the updated temperature of the additional computing component 660 to the second threshold. In some examples, the temperature control management computing module 620 determines, based on the comparing, that the temperature of the additional computing component 660 is greater than the second threshold. For example, the temperature of the additional computing component 660 is greater than 0° Celsius. The temperature control management computing module 620, in response to determining that the temperature of the additional computing component 660 is greater than the second threshold, adjusts the power state of the TEC 628 to an off power state.

In some examples, the temperature control management computing module 620 determines, based on the comparing, that the temperature of the additional computing component 660 is less than the first threshold and greater than the second threshold. For example, the temperature of the additional computing component 660 is less than 90° Celsius and greater than 0° Celsius. The temperature control management computing module 620, in response to determining that the temperature of the additional computing component 660 is less than the first threshold and greater than the second threshold, adjusts the power state of the TEC 628 to an off power state.

Figure 9:
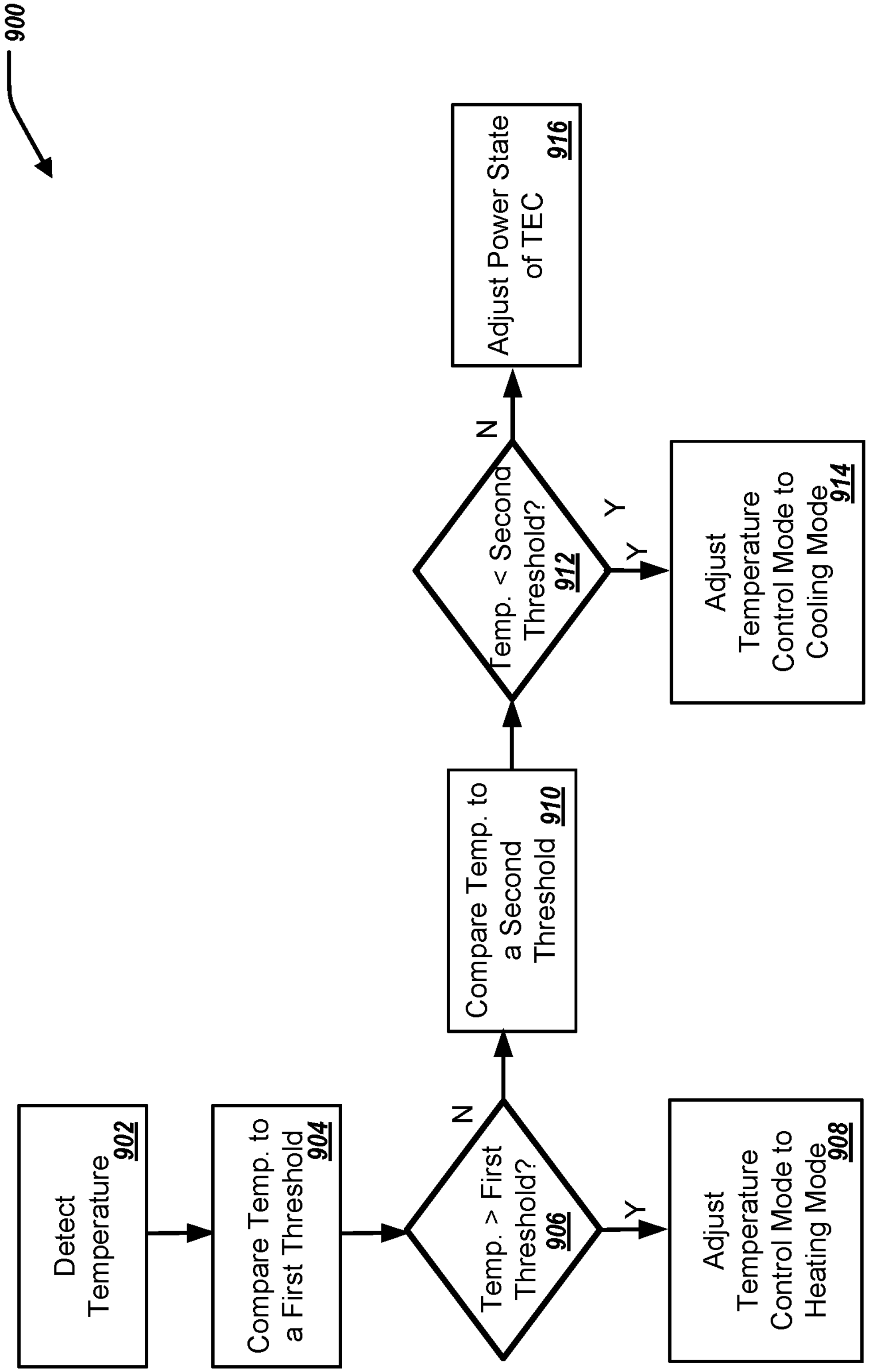
FIG. 9 illustrates a method for adaptive temperature control.

FIG. 9 illustrates a flowchart depicting selected elements of an embodiment of a method 900 for adaptive temperature control. The method 900 may be performed by the information handling system 100, the information handling systems 202, 402, 602, and/or the temperature control systems 210, 410, 610, and with reference to FIGS. 1-8. It is noted that certain operations described in method 900 may be optional or may be rearranged in different embodiments.

The sensor detects the temperature of the computing component, at 902. For example, the sensor 222 detects the temperature of the computing component 224; the sensor 256 detects the temperature of the of the additional computing component 250; the sensor 422 detects the temperature of the computing component 424; the sensor 622 detects the temperature of the computing component 624; and/or the sensor 662 detects the temperature of the additional computing component 660.

The temperature control management computing module compares the temperature of the computing component to a first threshold, at 904. For example, the temperature control management computing module 220 compares the temperature of the computing component 224 to the first threshold; the temperature control management computing module 220 compares the temperature of the additional computing component 250 to the first threshold; the temperature control management computing module 420 compares the temperature of the computing component 424 to the first threshold; the temperature control management computing module 620 compares the temperature of the computing component 624 to the first threshold; and/or the temperature control management computing module 620 compares the temperature of the additional computing component 660 to the first threshold.

The temperature control management computing module determines, based on the comparing, whether the temperature of the computing component is greater than the first threshold, at 906. For example, the temperature control management computing module 220 determines, based on the comparing, whether the temperature of the computing component 224 is greater than the first threshold; the temperature control management computing module 220 determines, based on the comparing, whether the temperature of the additional computing component 250 is greater than the first threshold; the temperature control management computing module 420 determines, based on the comparing, whether the temperature of the computing component 424 is greater than the first threshold; the temperature control management computing module 620 determines, based on the comparing, whether the temperature of the computing component 624 is greater than the first threshold; and/or the temperature control management computing module 620 determines, based on the comparing, whether the temperature of the additional computing component 660 is greater than the first threshold.

In some examples, the temperature control management computing module determines, based on the comparing, that the temperature of the computing component is greater than the first threshold (at 906), and in response, adjusts the temperature control mode of the TEC by providing a signal to the TEC to enable a cooling control mode of the TEC, at 908. For example, the temperature control management computing module 220, in response to determining that the temperature of the computing component 224 is greater than the first threshold, adjusts the temperature control mode of the TEC 228 by providing a signal to the TEC 228 to enable a cooling control mode of the TEC 228. For example, temperature control management computing module 220, in response to determining that the temperature of the additional computing component 250 is greater than the first threshold, adjusts the temperature control mode of the TEC 256 by providing a signal to the TEC 256 to enable a cooling control mode of the TEC 256. For example, temperature control management computing module 420, in response to determining that the temperature of the computing component 424 is greater than the first threshold, adjusts the temperature control mode of the TEC 428 by providing a signal to the TEC 428 to enable a cooling control mode of the TEC 428. For example, temperature control management computing module 620, in response to determining that the temperature of the computing component 624 is greater than the first threshold, adjusts the temperature control mode of the TEC 628 by providing a signal to the TEC 628 to enable a cooling control mode of the TEC 628. For example, temperature control management computing module 620, in response to determining that the temperature of the additional computing component 660 is greater than the first threshold, adjusts the temperature control mode of the TEC 628 by providing a signal to the TEC 628 to enable a cooling control mode of the TEC 628.

In some examples, the temperature control management computing module determines, based on the comparing, that the temperature of the computing component is less than the first threshold (at 906), and in response, the temperature control management computing module compares the temperature of the computing component to a second threshold, at 910. For example, the temperature control management computing module 220 compares the temperature of the computing component 224 to the second threshold; the temperature control management computing module 220 compares the temperature of the additional computing component 250 to the second threshold; the temperature control management computing module 420 compares the temperature of the computing component 424 to the second threshold; the temperature control management computing module 620 compares the temperature of the computing component 624 to the second threshold; and/or the temperature control management computing module 620 compares the temperature of the additional computing component 660 to the second threshold.

The temperature control management computing module determines, based on the comparing, whether the temperature of the computing component is less than the second threshold, at 912. For example, the temperature control management computing module 220 determines, based on the comparing, whether the temperature of the computing component 224 is less than the second threshold; the temperature control management computing module 220 determines, based on the comparing, whether the temperature of the additional computing component 250 is less than the second threshold; the temperature control management computing module 420 determines, based on the comparing, whether the temperature of the computing component 424 is less than the second threshold; the temperature control management computing module 620 determines, based on the comparing, whether the temperature of the computing component 624 is less than the second threshold; and/or the temperature control management computing module 620 determines, based on the comparing, whether the temperature of the additional computing component 660 is less than the second threshold.

In some examples, the temperature control management computing module determines, based on the comparing, that the temperature of the computing component is less than the second threshold (at 912), and in response, adjusts the temperature control mode of the TEC by providing a signal to the TEC to enable a heating control mode of the TEC, at 914. For example, the temperature control management computing module 220, in response to determining that the temperature of the computing component 224 is less than the second threshold, adjusts the temperature control mode of the TEC 228 by providing a signal to the TEC 228 to enable a heating control mode of the TEC 228. For example, temperature control management computing module 220, in response to determining that the temperature of the additional computing component 250 is less than the second threshold, adjusts the temperature control mode of the TEC 256 by providing a signal to the TEC 256 to enable a heating control mode of the TEC 228. For example, temperature control management computing module 420, in response to determining that the temperature of the computing component 424 is less than the second threshold, adjusts the temperature control mode of the TEC 428 by providing a signal to the TEC 428 to enable a heating control mode of the TEC 428. For example, temperature control management computing module 620, in response to determining that the temperature of the computing component 624 is less than the second threshold, adjusts the temperature control mode of the TEC 628 by providing a signal to the TEC 628 to enable a heating control mode of the TEC 628. For example, temperature control management computing module 620, in response to determining that the temperature of the additional computing component 660 is less than the second threshold, adjusts the temperature control mode of the TEC 628 by providing a signal to the TEC 628 to enable a heating control mode of the TEC 628.

In some examples, the temperature control management computing module determines, based on the comparing, that the temperature of the computing component is greater than the second threshold (at 912), and in response, the temperature control management computing module adjusts the power state of the TEC to an off power state. For example, the temperature control management computing module 220 adjusts the power state of the TEC 228 to an off power state. For example, the temperature control management computing module 220 adjusts the power state of the TEC 256 to an off power state. For example, the temperature control management computing module 420 adjusts the power state of the TEC 428 to an off power state. For example, the temperature control management computing module 620 adjusts the power state of the TEC 628 to an off power state.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A fanless adaptive temperature control system for a portable computing device, including:

a computing component;

an internal heat sink coupled to the computing component;

a thermal-electric chiller (TEC) in thermal communication with the internal heat sink and in thermal communication with a casing of the portable computing device;

an external heat sink including a casing surrounding the computing component, the internal heat sink, and the TEC;

a sensor configured to detect a temperature of the computing component;

a processor having access to memory media storing instructions executable by the processor to perform operations, comprising:

comparing the temperature of the computing component to a first threshold;

determining, based on the comparing, that the temperature of the computing component is greater than a first threshold;

in response to determining that the temperature of the computing component is greater than the first threshold:

adjusting a temperature control mode of the TEC such that heat transferred from the computing component to the TEC through the internal heat sink is transferred to the casing of the external heat sink and the casing of the portable computing device by the TEC.

2. The fanless adaptive temperature control system of claim 1, wherein the operations further include:

determining, based on the comparing, that the temperature of the computing component is less than a second threshold;

in response to determining that the temperature of the computing component is less than the second threshold:

adjusting the temperature control mode of the TEC to a second mode such that heat transferred from the external heat sink to the TEC is transferred by the TEC through the internal heat sink to the computing component.

3. The fanless adaptive temperature control system of claim 2, wherein adjusting the temperature control mode includes adjusting a polarity of current provided to the TEC.

4. The fanless adaptive temperature control system of claim 2, wherein the operations further include:

determining, based on the comparing, that the temperature of the computing component is less than the first threshold and greater than the second threshold;

in response to determining that the temperature of the computing component is less than the first threshold and greater than the second threshold:

adjusting a power state of the TEC to an off power state.

5. The fanless adaptive temperature control system of claim 1, wherein the TEC is coupled to the internal heat sink.

6. The fanless adaptive temperature control system of claim 5, wherein the TEC is coupled to the external heat sink.

7. The fanless adaptive temperature control system of claim 1, further including:

an additional internal heat sink in thermal communication with the internal heat sink, the additional internal heat sink spaced-apart from the internal heat sink, wherein the additional internal heat sink is coupled to the computing component.

8. The fanless adaptive temperature control system of claim 7, further including:

one or more heat pipes coupled between the additional internal heat sink and the internal heat sink, wherein the one or more heat pipes are in thermal communication between the additional heat sink and the internal heat sink.

9. The fanless adaptive temperature control system of claim 7, further including:

additional computing components in thermal communication with the internal heat sink, the additional components spaced-apart from the internal heat sink.

10. A portable computing device, comprising:

a processor;

memory media storing instructions executable by the processor to perform operations;

a fanless adaptive temperature control system, including:

a computing component;

an internal heat sink coupled to the computing component;

a thermal-electric chiller (TEC) in thermal communication with the internal heat sink and in thermal communication with a casing of the portable computing device;

an external heat sink including a casing surrounding the computing component, the internal heat sink, and the TEC;

a sensor configured to detect a temperature of the computing component;

wherein the operations comprise:

comparing the temperature of the computing component to a threshold;

determining, based on the comparing, that the temperature of the computing component is greater than a first threshold;

in response to determining that the temperature of the computing component is greater than the first threshold:

adjusting a temperature control mode of the TEC such that heat transferred from the computing component to the TEC through the internal heat sink is transferred to the casing of the external heat sink and the casing of the portable computing device by the TEC.

11. The portable computing device of claim 10, wherein the operations further include:

determining, based on the comparing, that the temperature of the computing component is less than a second threshold;

in response to determining that the temperature of the computing component is less than the second threshold:

adjusting the temperature control mode of the TEC to a second mode such that heat transferred from the external heat sink to the TEC is transferred by the TEC through the internal heat sink to the computing component.

12. The portable computing device of claim 11, wherein adjusting the temperature control mode includes adjusting a polarity of current provided to the TEC.

13. The portable computing device of claim 11, wherein the operations further include:

determining, based on the comparing, that the temperature of the computing component is less than the first threshold and greater than the second threshold;

in response to determining that the temperature of the computing component is less than the first threshold and greater than the second threshold:

adjusting a power state of the TEC to an off power state.

14. The portable computing device of claim 10, wherein the TEC is coupled to the internal heat sink.

15. The portable computing device of claim 14, wherein the TEC is coupled to the external heat sink.

16. The portable computing device of claim 10, the adaptive temperature control system further including:

an additional internal heat sink in thermal communication with the internal heat sink, the additional internal heat sink spaced-apart from the internal heat sink, wherein the additional internal heat sink is coupled to the computing component.

17. The portable computing device of claim 16, the adaptive temperature control system further including:

one or more heat pipes coupled between the additional internal heat sink and the internal heat sink, wherein the one or more heat pipes are in thermal communication between the additional heat sink and the internal heat sink.

18. The portable computing device of claim 16, the adaptive temperature control system further including:

additional computing components in thermal communication with the internal heat sink, the additional components spaced-apart from the internal heat sink.

* * * * *